(12) United States Patent
Bakalash et al.

(10) Patent No.: US 11,481,955 B2
(45) Date of Patent: *Oct. 25, 2022

(54) SYSTEM FOR PHOTO-REALISTIC REFLECTIONS IN AUGMENTED REALITY

(71) Applicant: Snap Inc., Santa Monica, CA (US)

(72) Inventors: Reuven Bakalash, Shdema (IL); Elad Haviv, Tsurit (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,644

(22) Filed: Feb. 13, 2021

(65) Prior Publication Data
US 2021/0166463 A1 Jun. 3, 2021

Related U.S. Application Data

(63) Continuation of application No. 16/788,792, filed on Feb. 12, 2020, now Pat. No. 10,930,053, which is a continuation of application No. 16/004,348, filed on Jun. 9, 2018, now Pat. No. 10,614,612, which is a continuation of application No. 15/659,618, filed on Jul. 26, 2017, now Pat. No. 10,410,401, which is a continuation of application No. 15/615,037, filed on Jun. 6, 2017, now Pat. No. 10,297,068, which is a continuation-in-part of application No. 15/376,580, filed on Dec. 12, 2016, now abandoned, and a
(Continued)

(51) Int. Cl.
*G06T 15/06* (2011.01)
*G06T 19/00* (2011.01)
*G06T 15/50* (2011.01)
*G06T 15/00* (2011.01)
*G06T 15/40* (2011.01)
*G06T 15/04* (2011.01)

(52) U.S. Cl.
CPC ............ *G06T 15/06* (2013.01); *G06T 15/005* (2013.01); *G06T 15/04* (2013.01); *G06T 15/405* (2013.01); *G06T 15/506* (2013.01); *G06T 19/006* (2013.01)

(58) Field of Classification Search
CPC ......... G06T 15/06; G06T 15/80; G06T 15/50; G06T 19/006; G06T 15/506; G06T 2200/04; G06T 2215/16; G06K 9/4661
See application file for complete search history.

(56) References Cited

U.S. PATENT DOCUMENTS 5,442,733 A 8/1995 Kaufman et al.
6,359,618 B1 3/2002 Heirich
6,621,925 B1 9/2003 Ohmori et al.
(Continued)

FOREIGN PATENT DOCUMENTS

WO 2015/192117 A1 12/2015

OTHER PUBLICATIONS

Wald et al., Interactive Rendering with Coherent Ray Tracing, Computer Graphics Forum, vol. 20, Sep. 2001, pp. 153-165.
(Continued)

*Primary Examiner* — Xiao M Wu
*Assistant Examiner* — Scott E Sonners
(74) *Attorney, Agent, or Firm* — Schwegman Lundberg & Woessner, P.A.

(57) ABSTRACT

The present disclosure describes a system for fast generation of ray traced reflections of virtually augmented objects into a real-world image, specifically on reflective surfaces. The system utilizes a standard raster graphics pipeline.

10 Claims, 21 Drawing Sheets

Related U.S. Application Data continuation-in-part of application No. 15/009,442, filed on Jan. 28, 2016, now Pat. No. 9,741,160.

(60) Provisional application No. 62/408,730, filed on Oct. 15, 2016, provisional application No. 62/354,755, filed on Jun. 26, 2016.

(56) References Cited

U.S. PATENT DOCUMENTS

| | | | |
|---|---|---|---|
| 6,911,984 | B2 | 6/2005 | Sabella |
| 6,967,663 | B1 | 11/2005 | Bastos |
| 7,212,207 | B2 | 5/2007 | Green et al. |
| 9,424,685 | B2 | 8/2016 | Howson |
| 9,483,865 | B2 | 11/2016 | Bakalash |
| 9,576,389 | B2 | 2/2017 | Lee |
| 9,607,426 | B1 | 3/2017 | Peterson |
| 9,672,654 | B2 | 6/2017 | Shin |
| 9,697,640 | B2 | 7/2017 | Obert |
| 9,741,160 | B2 | 8/2017 | Bakalash |
| 10,204,442 | B2 | 2/2019 | Bakalash et al. |
| 10,217,268 | B2 | 2/2019 | Bakalash et al. |
| 10,229,527 | B2 | 3/2019 | Bakalash et al. |
| 10,297,068 | B2 | 5/2019 | Bakalash et al. |
| 10,332,304 | B1 | 6/2019 | Bakalash |
| 10,395,415 | B2 | 8/2019 | Bakalash |
| 10,395,416 | B2 | 8/2019 | Bakalash |
| 10,403,027 | B2 | 9/2019 | Bakalash et al. |
| 10,410,401 | B1 | 9/2019 | Bakalash et al. |
| 10,565,776 | B2 | 2/2020 | Bakalash |
| 10,614,612 | B2 | 4/2020 | Bakalash et al. |
| 10,699,468 | B2 | 6/2020 | Bakalash et al. |
| 10,789,759 | B2 | 9/2020 | Bakalash et al. |
| 10,930,053 | B2 | 2/2021 | Bakalash et al. |
| 10,950,030 | B2 | 3/2021 | Bakalash et al. |
| 11,017,582 | B2 | 5/2021 | Bakalash et al. |
| 11,302,058 | B2 | 4/2022 | Bakalash et al. |
| 2007/0257911 | A1 | 11/2007 | Bavoil et al. |
| 2008/0088622 | A1 | 4/2008 | Shearer |
| 2008/0100617 | A1 | 5/2008 | Keller et al. |
| 2008/0231627 | A1 | 9/2008 | Shearer |
| 2009/0073167 | A1 | 3/2009 | Brown |
| 2009/0073187 | A1 | 3/2009 | Rampson et al. |
| 2009/0102844 | A1 | 4/2009 | Deparis |
| 2009/0128552 | A1 | 5/2009 | Fujiki |
| 2009/0128562 | A1 | 5/2009 | McCombe |
| 2009/0167763 | A1 | 7/2009 | Waechter |
| 2009/0213115 | A1 | 8/2009 | Keller |
| 2010/0053162 | A1 | 3/2010 | Dammertz |
| 2010/0060637 | A1 | 3/2010 | Shearer |
| 2010/0079457 | A1 | 4/2010 | Tavenrath |
| 2010/0239185 | A1 | 9/2010 | Fowler et al. |
| 2011/0066682 | A1 | 3/2011 | Aldunate |
| 2012/0069023 | A1 | 3/2012 | Hur |
| 2012/0213430 | A1 | 8/2012 | Nutter |
| 2013/0120385 | A1 | 5/2013 | Krishnaswamy |
| 2013/0190602 | A1 | 7/2013 | Liao |
| 2014/0049539 | A1 | 2/2014 | Lee |
| 2014/0078143 | A1 | 3/2014 | Lee |
| 2014/0375641 | A1 | 12/2014 | Bakalash |
| 2014/0375645 | A1 | 12/2014 | Bakalash |
| 2015/0042655 | A1 | 2/2015 | Gautron et al. |
| 2015/0109302 | A1 | 4/2015 | Lee |
| 2015/0172641 | A1 | 6/2015 | Nakamura |
| 2016/0005209 | A1 | 1/2016 | Dachsbacher |
| 2016/0027204 | A1 | 1/2016 | Lee |
| 2016/0055608 | A1 | 2/2016 | Frascati |
| 2016/0155258 | A1 | 6/2016 | Bakalash |
| 2016/0284118 | A1 | 9/2016 | Howson |
| 2017/0061674 | A1 | 3/2017 | Lee |
| 2017/0103567 | A1 | 4/2017 | Peterson |
| 2017/0109931 | A1 | 4/2017 | Knorr |
| 2017/0178398 | A1 | 6/2017 | Afra |
| 2017/0236247 | A1 | 8/2017 | Akenine-Moller |
| 2017/0236325 | A1 | 8/2017 | Lecocq |
| 2017/0372508 | A1 | 12/2017 | Schoeneman |
| 2018/0350128 | A1 | 12/2018 | Bakalash et al. |
| 2018/0365880 | A1 | 12/2018 | Bakalash et al. |
| 2018/0374255 | A1 | 12/2018 | Bakalash et al. |
| 2018/0374256 | A1 | 12/2018 | Bakalash et al. |
| 2019/0057544 | A1 | 2/2019 | Lecocq |
| 2019/0147637 | A1 | 5/2019 | Bakalash et al. |
| 2019/0180496 | A1 | 6/2019 | Bakalash |
| 2019/0180497 | A1 | 6/2019 | Bakalash |
| 2019/0188897 | A1 | 6/2019 | Bakalash |
| 2019/0304163 | A1 | 10/2019 | Bakalash |
| 2019/0378323 | A1 | 12/2019 | Bakalash et al. |
| 2020/0058155 | A1 | 2/2020 | Bakalash et al. |
| 2020/0143581 | A1 | 5/2020 | Bakalash et al. |
| 2020/0219305 | A1 | 7/2020 | Bakalash et al. |
| 2020/0320773 | A1 | 10/2020 | Bakalash et al. |
| 2020/0380764 | A1 | 12/2020 | Bakalash et al. |
| 2021/0201560 | A1 | 7/2021 | Bakalash et al. |

OTHER PUBLICATIONS

Hanraman et al., Ray Tracing on Programmable Graphics Hardware, ACM Siggraph 2001 Proceedings, pp. 703-712.

Parker et al., OptiX: A general purpose ray tracing engine, Journal ACM Transactions on Graphics—Proceedings of ACM Siggraph 2010, vol. 29, issued on Jul. 4, 2010, Article No. 86.

Wald et al., Realtime Ray Tracing and its use for Interactive Global Illumination, Proceedings of Eurographics 2003.

Wald et al., Ray Tracing Animated Scenes using Coherent Grid Traversal, ACM 2006.

Broecker, Markus, Bruce H. Thomas, and Ross T. Smith, "Adapting ray tracing to spatial augmented reality", 2013 IEEE International Symposium on Mixed and Augmented Reality (ISMAR), IEEE, 2013.

Kan, Peter, and Hannes Kaufmann, "Differential irradiance caching for fast high-quality light transport between virtual and real worlds", 2013 IEEE International on Mixed and Augmented Reality (ISMAR), IEEE, 2013.

Kan, Peter, and Hannes Kaufmann, "High-quality reflections, reflections, and caustics in augmented reality and their contribution to visual coherence", 2012 IEEE International Symposium on Mixed and Augmented Reality (ISMAR), IEEE, 2012.

McGuire et al, Efficient GPU screen-space ray tracing, Journal of Computer Graphics Techniques, vol. 3, No. 4, 2014.

Henrik Wann Jenson, Niels Jorden Christensen, Photon maps in bidirectional Monte Carlo ray tracing of complex objects, In Computers & Graphics, vol. 19, Issue 2, 1995, pp. 215-224, ISSN 0097-8493.

Celarek, Adam, "Merging ray tracking and rasterization in mixed reality", Vienna University of Technology (2012).

Santos et al., "Real Time Ray Tracing for Augmented Reality", 14th Symposium on Virtual and Augmented Reality, May 28-31, 2012, pp. 2-8.

"U.S. Appl. No. 14/479,322, Final Office Action dated Jun. 4, 2015", 19 pgs.

"U.S. Appl. No. 14/479,322, Non Final Office Action dated Jan. 22, 2015", 26 pgs.

"U.S. Appl. No. 14/479,322, Notice of Allowance dated Aug. 29, 2016", 8 pgs.

"U.S. Appl. No. 14/479,322, Notice of Non-Compliant Amendment dated Apr. 29, 2015", 2 pgs.

"U.S. Appl. No. 14/479,322, Notice of Non-Compliant Amendment dated Jul. 29, 2016", 3 pgs.

"U.S. Appl. No. 14/479,322, Response filed Feb. 22, 2016 to Final Office Action dated Jun. 4, 2015", 9 pgs.

"U.S. Appl. No. 14/479,322, Response filed Apr. 22, 2015 to Non Final Office Action dated Jan. 22, 2015", 10 pgs.

"U.S. Appl. No. 14/479,322, Response filed May 21, 2015 to Notice of Non-Compliant Amendment dated Apr. 29, 2015", 10 pgs.

"U.S. Appl. No. 14/479,322, Response filed Aug. 15, 2016 to Notice of Non-Compliant Amendment dated Jul. 29, 2016", 10 pgs.

"U.S. Appl. No. 15/009,442, Non Final Office Action dated Mar. 21, 2017", 9 pgs.

(56) References Cited

OTHER PUBLICATIONS

"U.S. Appl. No. 15/009,442, Notice of Allowance dated Jun. 29, 2017", 5 pgs.
"U.S. Appl. No. 15/009,442, Response filed Jun. 12, 2017 to Non Final Office Action dated Mar. 21, 2017", 4 pgs.
"U.S. Appl. No. 15/615,037, Final Office Action dated Jul. 11, 2018", 13 pgs.
"U.S. Appl. No. 15/615,037, Non Final Office Action dated Sep. 27, 2017", 15 pgs.
"U.S. Appl. No. 15/615,037, Notice of Allowance dated Jan. 15, 2019", 5 pgs.
"U.S. Appl. No. 15/615,037, Notice of Non-Compliant Amendment dated Dec. 26, 2017", 3 pgs.
"U.S. Appl. No. 15/615,037, Response filed Jan. 7, 2019 to Final Office Action dated Jul. 11, 2018", 4 pgs.
"U.S. Appl. No. 15/615,037, Response filed Feb. 21, 2018 to Notice of Non-Compliant Amendment dated Dec. 26, 2017", 5 pgs.
"U.S. Appl. No. 15/615,037, Response filed Nov. 13, 2017 to Non Final Office Action dated Sep. 27, 2017", 5 pgs.
"U.S. Appl. No. 15/615,037, Response filed Dec. 31, 2018 to Final Office Action dated Jul. 11, 2018", 4 pgs.
"U.S. Appl. No. 15/640,464, 312 Amendment filed Dec. 10, 2018", 3 pgs.
"U.S. Appl. No. 15/640,464, Final Office Action dated Dec. 27, 2017", 14 pgs.
"U.S. Appl. No. 15/640,464, Non Final Office Action dated Mar. 30, 2018", 11 pgs.
"U.S. Appl. No. 15/640,464, Non Final Office Action dated Sep. 27, 2017", 17 pgs.
"U.S. Appl. No. 15/640,464, Notice of Allowance dated Oct. 26, 2018", 5 pgs.
"U.S. Appl. No. 15/640,464, PTO Response to Rule 312 Communication dated Dec. 13, 2018", 2 pgs.
"U.S. Appl. No. 15/640,464, Response filed Mar. 12, 2018 to Final Office Action dated Dec. 27, 2017", 1 pg.
"U.S. Appl. No. 15/640,464, Response filed Nov. 13, 2017 to Non Final Office Action dated Sep. 27, 2017", 6 pgs.
"U.S. Appl. No. 15/640,466, Ex Parte Quayle Action mailed Oct. 15, 2018", 4 pgs.
"U.S. Appl. No. 15/640,466, Final Office Action dated Apr. 3, 2018", 9 pgs.
"U.S. Appl. No. 15/640,466, Non Final Office Action dated Oct. 5, 2017", 11 pgs.
"U.S. Appl. No. 15/640,466, Notice of Allowance dated Jan. 28, 2019", 5 pgs.
"U.S. Appl. No. 15/640,466, Notice of Allowance dated Dec. 26, 2018", 7 pgs.
"U.S. Appl. No. 15/640,466, Response filed Mar. 5, 2018 to Non Final Office Action dated Oct. 5, 2017", 4 pgs.
"U.S. Appl. No. 15/640,466, Response filed Sep. 19, 2018 to Final Office Action dated Apr. 3, 2018", 5 pgs.
"U.S. Appl. No. 15/640,466, Response filed Dec. 10, 2018 to Ex Parte Quayle Action mailed Oct. 15, 2018", 6 pgs.
"U.S. Appl. No. 15/640,467, 312 Amendment filed Dec. 10, 2018", 3 pgs.
"U.S. Appl. No. 15/640,467, Corrected Notice of Allowability dated Oct. 22, 2018", 4 pgs.
"U.S. Appl. No. 15/640,467, Final Office Action dated Apr. 3, 2018", 9 pgs.
"U.S. Appl. No. 15/640,467, Non Final Office Action dated Oct. 4, 2017", 11 pgs.
"U.S. Appl. No. 15/640,467, Notice of Allowance dated Oct. 3, 2018", 7 pgs.
"U.S. Appl. No. 15/640,467, PTO Response to Rule 312 Communication dated Dec. 17, 2018", 2 pgs.
"U.S. Appl. No. 15/640,467, Response filed Mar. 5, 2018 to Non Final Office Action dated Oct. 4, 2017", 4 pgs.
"U.S. Appl. No. 15/640,467, Response filed Sep. 23, 2018 to Final Office Action dated Apr. 3, 2018", 6 pgs.
"U.S. Appl. No. 15/659,618, Non Final Office Action dated Oct. 30, 2017", 11 pgs.
"U.S. Appl. No. 15/659,618, Notice of Allowance dated Apr. 10, 2018", 7 pgs.
"U.S. Appl. No. 15/659,618, PTO Response to Rule 312 Communication dated Jun. 19, 2018", 2 pgs.
"U.S. Appl. No. 15/659,618, Response filed Mar. 5, 2018 to Non Final Office Action dated Oct. 30, 2017", 8 pgs.
"U.S. Appl. No. 16/004,348, 312 Amendment filed Feb. 12, 2020", 3 pgs.
"U.S. Appl. No. 16/004,348, Advisory Action dated Jun. 5, 2019", 3 pgs.
"U.S. Appl. No. 16/004,348, Final Office Action dated Apr. 1, 2019", 17 pgs.
"U.S. Appl. No. 16/004,348, Non Final Office Action dated Aug. 8, 2019", 9 pgs.
"U.S. Appl. No. 16/004,348, Non Final Office Action dated Oct. 30, 2018", 17 pgs.
"U.S. Appl. No. 16/004,348, Notice of Allowance dated Nov. 14, 2019", 8 pgs.
"U.S. Appl. No. 16/004,348, Response filed Feb. 11, 2019 to Non Final Office Action dated Oct. 30, 2018", 6 pgs.
"U.S. Appl. No. 16/004,348, Response filed May 27, 2019 to Final Office Action dated Apr. 1, 2019", 10 pgs.
"U.S. Appl. No. 16/004,348, Response filed Jun. 23, 2019 to Advisory Action dated Jun. 5, 2019", 10 pgs.
"U.S. Appl. No. 16/004,348, Response filed Oct. 31, 2019 to Non Final Office Action dated Aug. 8, 2019", 5 pgs.
"U.S. Appl. No. 16/004,348, Supplemental Notice of Allowability dated Mar. 9, 2020", 4 pgs.
"U.S. Appl. No. 16/231,520, Final Office Action dated Apr. 10, 2019", 6 pgs.
"U.S. Appl. No. 16/231,520, Non Final Office Action dated Jan. 30, 2019", 7 pgs.
"U.S. Appl. No. 16/231,520, Notice of Allowance dated May 17, 2019", 5 pgs.
"U.S. Appl. No. 16/231,520, Notice of Allowance dated Jul. 26, 2019", 5 pgs.
"U.S. Appl. No. 16/231,520, Response filed Mar. 27, 2019 to Non Final Office Action dated Jan. 30, 2019", 6 pgs.
"U.S. Appl. No. 16/231,520, Response filed May 5, 2019 to Final Office Action dated Apr. 10, 2019", 6 pgs.
"U.S. Appl. No. 16/275,366, Non Final Office Action dated Apr. 1, 2019", 8 pgs.
"U.S. Appl. No. 16/275,366, Notice of Allowance dated May 13, 2019", 7 pgs.
"U.S. Appl. No. 16/275,366, Response filed Apr. 21, 2019 to Non Final Office Action dated Apr. 1, 2019", 3 pgs.
"U.S. Appl. No. 16/275,371, Non Final Office Action dated Apr. 1, 2019", 10 pgs.
"U.S. Appl. No. 16/275,371, Notice of Allowance dated May 10, 2019", 7 pgs.
"U.S. Appl. No. 16/275,371, Response filed Apr. 21, 2019 to Non Final Office Action dated Apr. 1, 2019", 3 pgs.
"U.S. Appl. No. 16/275,907, Non Final Office Action dated Apr. 10, 2019", 6 pgs.
"U.S. Appl. No. 16/275,907, Notice of Allowance dated May 13, 2019", 5 pgs.
"U.S. Appl. No. 16/275,907, Response filed Apr. 21, 2019 to Non Final Office Action dated Apr. 10, 2019", 3 pgs.
"U.S. Appl. No. 16/444,464, Non Final Office Action dated Jul. 9, 2019", 14 pgs.
"U.S. Appl. No. 16/444,464, Notice of Allowance dated Oct. 11, 2019", 7 pgs.
"U.S. Appl. No. 16/444,464, Response filed Oct. 3, 2019 to Non Final Office Action dated Jul. 9, 2019", 5 pgs.
"U.S. Appl. No. 16/662,657, Non Final Office Action dated Dec. 19, 2019", 6 pgs.
"U.S. Appl. No. 16/662,657, Notice of Allowance dated Mar. 23, 2020", 5 pgs.
"U.S. Appl. No. 16/662,657, Preliminary Amendment filed Nov. 15, 2019", 3 pgs.

(56) References Cited

OTHER PUBLICATIONS

"U.S. Appl. No. 16/662,657, Response filed Mar. 10, 2020 to Non Final Office Action dated Dec. 19, 2019", 8 pgs.
"U.S. Appl. No. 16/736,848, 312 Amendment filed Aug. 4, 2020", 3 pgs.
"U.S. Appl. No. 16/736,848, Non Final Office Action dated Feb. 11, 2020", 16 pgs.
"U.S. Appl. No. 16/736,848, Notice of Allowance dated May 14, 2020", 7 pgs.
"U.S. Appl. No. 16/736,848, Response filed May 5, 2020 to Non Final Office Action dated Feb. 11, 2020", 3 pgs.
"U.S. Appl. No. 16/788,792, Non Final Office Action dated Apr. 3, 2020", 12 pgs.
"U.S. Appl. No. 16/788,792, Notice of Allowance dated Oct. 22, 2020", 8 pgs.
"U.S. Appl. No. 16/788,792, Response filed Jun. 10, 2020 to Non Final Office Action dated Apr. 3, 2020", 6 pgs.
"U.S. Appl. No. 16/909,063, Non Final Office Action dated Aug. 25, 2020", 8 pgs.
"U.S. Appl. No. 16/909,063, Notice of Allowance dated Nov. 23, 2020", 5 pgs.
"U.S. Appl. No. 16/909,063, Response filed Nov. 8, 2020 to Non Final Office Action dated Aug. 25, 2020", 5 pgs.
"U.S. Appl. No. 16/994,615, Non Final Office Action dated Aug. 25, 2020", 17 pgs.
"U.S. Appl. No. 16/994,615, Notice of Allowance dated Feb. 1, 2021", 7 pgs.
"U.S. Appl. No. 16/994,615, Response filed Nov. 8, 2020 to Non Final Office Action dated Aug. 25, 2020", 3 pgs.
"U.S. Appl. No. 17/183,395, Non Final Office Action dated Jul. 28, 2021", 8 pgs.
"U.S. Appl. No. 17/183,395, Notice of Allowance dated Dec. 20, 2021", 5 pgs.
"U.S. Appl. No. 17/183,395, Response filed Dec. 2, 2021 to Non Final Office Action dated Jul. 28, 2021", 7 pgs.
Alwani, Rishi, "Microsoft and Nvidia Tech to Bring Photorealistic Games With Ray Tracing", Gadgets 360, [Online] Retrieved from the Internet: <URL: https://gadgets.ndtv.com/laptops/news/microsoft-dxr-nvidia-rtx-ray-tracing-volta-gpu-metro-exodus-1826988>, (Mar. 21, 2018), 8 pgs.
Beck, et al., "CPU-GPU hybrid real time ray tracing framework", vol. 0 (1981), (2005), 1-8.
Bikker, J, "Real-time ray tracing through the eyes of a game developer", In: Proceedings of the 2007 IEEE Symposium on Interactive Ray Tracing, Washington, DC, USA, IEEE Computer Society, (2007), 10 pgs.
Chen, C. C, et al., "Use of hardware z-buffered rasterization to accelerate ray tracing", In: Proceedings of the 2007 ACM symposium on Applied computing. SAC '07, New York, NY, USA, ACM, (2007), 1046-1050.
Fredriksson, Johan, et al., "Generating Real Time Reflections by Ray Tracing Approximate Geometry", Chalmers University of Technology, Gothenburg, Sweden, (2016), 46 pgs.
Kajiya, J. T, "The rendering equation", In Proc. SIGGRAPH, vol. 20, No. 4, (1986), 143-150.
Peddie, Jon, "Peddie predicts we could have real time ray tracing on our PCs in less than 6 years", TechWatch, [Online] Retrieved from the Internet: <URL: https://www.jonpeddie.com/press-releases/peddie-predicts-we-could-have-real-time-ray-tracing-on-our-pcs-in-less-than/>, (Mar. 27, 2018), 2 pgs.

Sabino, Thales, et al., "A Hybrid GPU Rasterized and Ray Traced Rendering Pipeline for Real Time Rendering of Per Pixel Effects", ICEC 2012, Univ. Federal Fluminense, Rio de Janeiro, Brazil, (2013), 14 pgs.
Sadeghi, Iman, et al., "Coherent Path Tracing", Jensen University of California, San Diego, (2009), 12 pgs.
Wald, et al., "Interactive Rendering with Coherent ray Tracing", Computer Graphics Forum vol. 20, (Sep. 2001), 153-165.
Wyman, Chris, "Voxelized shadow volumes", Proceedings of the ACM SIGGRAPH Symposium on High Performance Graphics, ACM, (2011), 34 pgs.
U.S. Appl. No. 16/662,657 U.S. Pat. No. 10,699,468, filed Oct. 24, 2019, Method for Non-Planar Specular Reflections in Hybrid Ray Tracing.
U.S. Appl. No. 16/909,063 U.S. Pat. No. 10,950,030, filed Jun. 23, 2020, Specular Reflections in Hybrid Ray Tracing.
U.S. Appl. No. 17/183,395 U.S. Pat. No. 11,302,058, filed Feb. 24, 2021, System for Non-Planar Specular Reflections in Hybrid Ray Tracing.
U.S. Appl. No. 17/654,714, filed Mar. 14, 2022, System for Non-Planar Specular Reflections in Hybrid Ray Tracing.
U.S. Appl. No. 14/479,322 U.S. Pat. No. 9,483,865, filed Sep. 7, 2014, Ray Shooting Method Utilizing Geometrical Stencils.
U.S. Appl. No. 15/009,442 U.S. Pat. No. 9,741,160, filed Jan. 28, 2016, Shadowing Method for Ray Tracing Based on Geometrical Stencils.
U.S. Appl. No. 16/736,848 U.S. Pat. No. 10,789,759, filed Jan. 8, 2020, Method for Fast Generation of Path Traced Reflections on a Semi-Reflective Surface.
U.S. Appl. No. 15/615,037 U.S. Pat. No. 10,297,068, filed Jun. 6, 2017, Method for Ray Tracing Augmented Objects.
U.S. Appl. No. 16/994,615 U.S. Pat. No. 11,017,582, filed Aug. 16, 2020, Method for Fast Generation of Path Traced Reflections on a Semi-Reflective Surface.
U.S. Appl. No. 15/640,464 U.S. Pat. No. 10,204,442, filed Jul. 1, 2017, System for Ray Tracing Augmented Objects.
U.S. Appl. No. 15/640,466 U.S. Pat. No. 10,229,527, filed Jul. 1, 2017, Method for Fast Intersection of Secondary Rays With Geometric Objects in Ray Tracing.
U.S. Appl. No. 15/640,467 U.S. Pat. No. 10,217,268, filed Jul. 1, 2017, System for Fast Intersection of Secondary Rays With Geometric Objects in Ray Tracing.
U.S. Appl. No. 16/231,520 U.S. Pat. No. 10,403,027, filed Dec. 23, 2018, System for Ray Tracing Sub-Scenes in Augmented Reality.
U.S. Appl. No. 16/275,366 U.S. Pat. No. 10,395,415, filed Feb. 14, 2019, Method of Fast Intersection in Ray Tracing Utilizing Hardware Graphics Pipeline.
U.S. Appl. No. 16/275,371 U.S. Pat. No. 10,332,304, filed Feb. 14, 2019, System for Fast Intersection in Ray Tracing.
U.S. Appl. No. 16/275,907 U.S. Pat. No. 10,395,416, filed Feb. 14, 2019, Method for Rendering an Augmented Objects.
U.S. Appl. No. 16/444,464 U.S. Pat. No. 10,565,776, filed Jun. 18, 2019, Method for Fast Generation of Path Traced Reflections on a Semi-Reflective Surface.
U.S. Appl. No. 15/376,580, filed Dec. 12, 2016, Path Tracing Method Implemented on Cells and Employing Distributed Acceleration Structures.
U.S. Appl. No. 15/659,618 U.S. Pat. No. 10,410,401, filed Jul. 26, 2017, Spawing Secondary Rays in Ray Tracing From Non Primary Rays.
U.S. Appl. No. 16/004,348 U.S. Pat. No. 10,614,612, filed Jun. 9, 2018, Fast Path Traced Reflections for Augmented Reality.
U.S. Appl. No. 16/788,792 U.S. Pat. No. 10,930,053, filed Feb. 12, 2020, System for Fast Reflections in Augmented Reality.

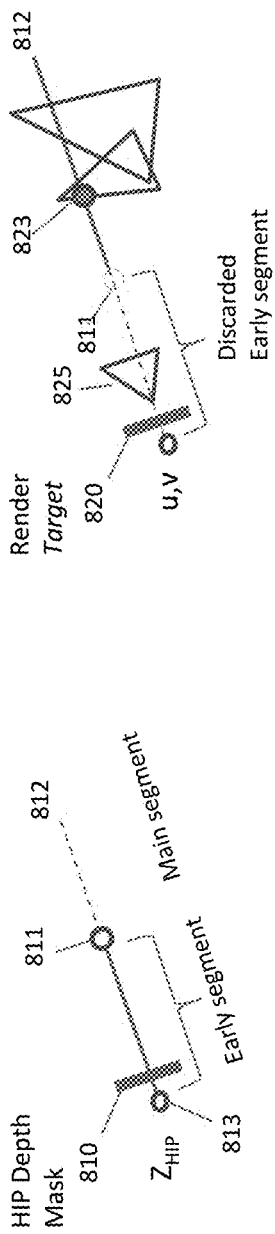

SYSTEM FOR PHOTO-REALISTIC REFLECTIONS IN AUGMENTED REALITY

CROSS-REFERENCE TO RELATED CASES

The present invention is a Continuation of U.S. application Ser. No. 16/788,792, filed Feb. 12, 2020, entitled "System for Fast Reflections in Augmented Reality"; which is a Continuation of U.S. application Ser. No. 16/004,348 filed Jun. 9, 2018, entitled "Fast Path Traced Reflections for Augmented Reality" (now U.S. Pat. No. 10,614,612); which is a Continuation of U.S. application Ser. No. 15/659,618 filed Jul. 26, 2017 entitled "Spawning Secondary Rays in Ray Tracing from Non Primary Rays" (now U.S. Pat. No. 10,410,401); which is a Continuation of U.S. application Ser. No. 15/615,037 filed Jun. 6, 2017 entitled "Method for Ray Tracing Augmented Objects" (now U.S. Pat. No. 10,297,068); which claims the benefit of U.S. Provisional Application Ser. No. 62/354,755, filed on Jun. 26, 2016, and of U.S. Provisional Application Ser. No. 62/408,730, filed on Oct. 15, 2016, and which is a Continuation-In-Part of the U.S. application Ser. No. 15/376,580 filed Dec. 12, 2016; and which is a Continuation-In-Part of the U.S. application Ser. No. 15/009,442 filed Jan. 28, 2016 (now U.S. Pat. No. 9,741,160), all of which are hereby incorporated by reference.

FIELD OF THE INVENTION

The present invention relates to new and improved ways of carrying out ray tracing method having a reduced computational complexity.

BACKGROUND OF THE INVENTION

Augmented reality (AR) is a live view of a physical, real-world environment whose elements are augmented by computer-generated graphics. Information about the augmented objects is overlaid onto the real world. Augmentation is conventionally in real time and in visual context with environmental elements. With the help of advanced AR technology, the information about the surrounding real world of the user becomes interactive and digitally manipulable. Because AR brings out the components of the digital world into a person's perceived real world, the user experiences and interacts with the augmented reality, strongly depend on the photo-realistic quality of the augmented object and its integration with the real environment.

In prior art, the graphics used in AR is based on the conventional raster technology. However, raster graphics are very mediocre due to the tradeoff of quality and speed, in favor of speed. Its visual context lacks such necessary elements of photo-realism as reflections, refractions, color bleeding, caustics, etc. The only graphics technology competent to deliver the required highest photo-realism is ray tracing, found today in the film industry.

Ray tracing is a computer graphics technique for generating images by tracing the rays of light and simulating the effects of their encounters with virtual objects. The idea behind raytracing is to find mathematical solutions to compute the intersection of a ray with various types of geometry, by solving the visibility between points. This technique is capable of producing a high visual realism. In low-end ray tracing, light sources are the only illuminating objects in the scene.

More realistic imaging is delivered by the high-end ray tracing, called path tracing, which is based on global illumination. Global illumination takes into account not only the light which comes directly from a light source, but also subsequent cases in which light is returned by other surfaces in the scene, whether reflective or not.

Path tracing, referred to as Monte Carlo ray tracing, renders a 3D scene by randomly tracing samples of light paths. Repeated sampling for any given pixel in the image will eventually cause the average of the samples to converge to the correct solution of a rendering equation, making it one of the most physically accurate 3D graphic rendering methods in existence. Path tracing can generate images that are faithful to reality, and are indistinguishable from photographs (e.g. the Avatar movie). The visual quality is higher than that of the low end ray tracing, but at a much greater computational cost.

The most time-consuming tasks in the ray tracing of prior art are traversals of acceleration structures, as well as intersection tests between rays and polygons. Every single ray is traversed across an accelerating structure (e.g. K-trees or BVH trees), seeking polygons that are candidates for intersection. These traversals become a major time-consuming action—they typically take 60%-70% of the image generation time. Then, many scene polygons located along a ray, must undergo a line-polygon intersection test, to determine the earliest hit along the ray's path.

The layout of the prior art ray tracing method is depicted in FIG. 1. First, an acceleration structure must be constructed 10. The construction is done as a preprocessing step, and takes much more time than generating a single image. Generally, the construction time depends on the scene size. The bigger the scene, the longer the construction time. Every major modification in the scene necessitates a reconstruction of the acceleration structure. The memory size is typically doubled by the acceleration structure. Tracing of rays 12 is based on massive traversals of the acceleration structure 11, when each ray is traversed across the structure in search of intersections between the ray and various scene objects. The resulting intersection points are lighted, textured, shaded 13, and aggregated into image pixels.

There are two major drawbacks associated with the use of acceleration structures in ray tracing of prior art; (i) they must be repeatedly reconstructed for scene changes, and (ii) traversals of these structures are time-consuming. Both disadvantages contradict with the real-time requirements of AR.

Therefore, the primary object of the present invention is to introduce a global illumination ray tracing to AR and VR.

Another object of the present invention is to accelerate the performance of global illumination ray tracing up to real time, making it suitable for AR and VR.

Another object of the present invention is to reduce the computational complexity of ray tracing by making the prior art accelerating structures redundant.

Another object of the present invention is to further reduce the computational complexity of ray tracing by reducing and simplifying the intersection tests.

Another object of the present invention is to reduce the power consumption of ray tracing.

Yet another object of the present invention is to introduce global illumination ray tracing to the consumer level of computing devices.

SUMMARY OF THE PRESENT INVENTION

Some embodiments of the current invention are applied to both augmented reality (AR) and virtual reality (VR). AR is a live view of a physical, real-world environment whose elements are augmented by computer-generated graphics. VR replaces the real world with a simulated one. Augmentation must be done in real time and in a convincing visual context with the surrounding real world (in AR) or computer generated (VR). The user's experience and interaction are directly affected by the level of realism.

In the prior art, the imaging of augmented objects is produced by the conventional raster graphics, due to its high speed. However, the ordinary raster graphics technology is mediocre in image quality and in visual context with the real-world environment. The desired image quality found today in the film industry, does not fit the AR because of its very high computational complexity, which causes long production times and requires expensive computing farms.

The present invention teaches an innovative way of delivering path tracing in real time, with reduced computational complexity and power consumption, and suitable to the processing level of consumer computing devices. Aspects of the present invention enable to concentrate on selected objects, generating their photo-realistic image, overlaid with a preset environment.

In the embodiments of the present invention, the Acceleration Structures of prior art are replaced by a new and novel device—a Dynamically Aligned Structure (DAS). DAS is a means for carrying out the intersection between the secondary rays and the scene geometry in large groups of rays, gaining a high speed and a reduced computational complexity.

FIG. 2 shows the stages of the present invention's path tracing. The main difference as compared to the prior art (FIG. 1) is the lack of acceleration structures. These structures are replaced by the DAS device 21. There is no pre-processing for reconstruction, and no traversals of acceleration structures.

The DAS is an aligned projection of rays, used to carry secondary rays associated with existing hit points. Instead of an individual shooting of secondary rays for every single hit point (or in small packets of rays), as in the prior art, we do it collectively, cutting the cost.

BRIEF DESCRIPTION OF THE DRAWINGS

The invention is herein described, by way of non-limiting examples only, with reference to the accompanying figures and drawings, wherein like designations denote like elements. Understanding that these drawings only provide information concerning typical embodiments of the invention and are not therefore to be considered limiting in scope:

FIG. 8a. DAS renders HIPs data only.

FIG. 8b. DAS renders the scene geometry. Objects along the early segment of DAS ray are discarded.

DETAILED DESCRIPTION OF THE PREFERRED EMBODIMENTS

Figure 1:
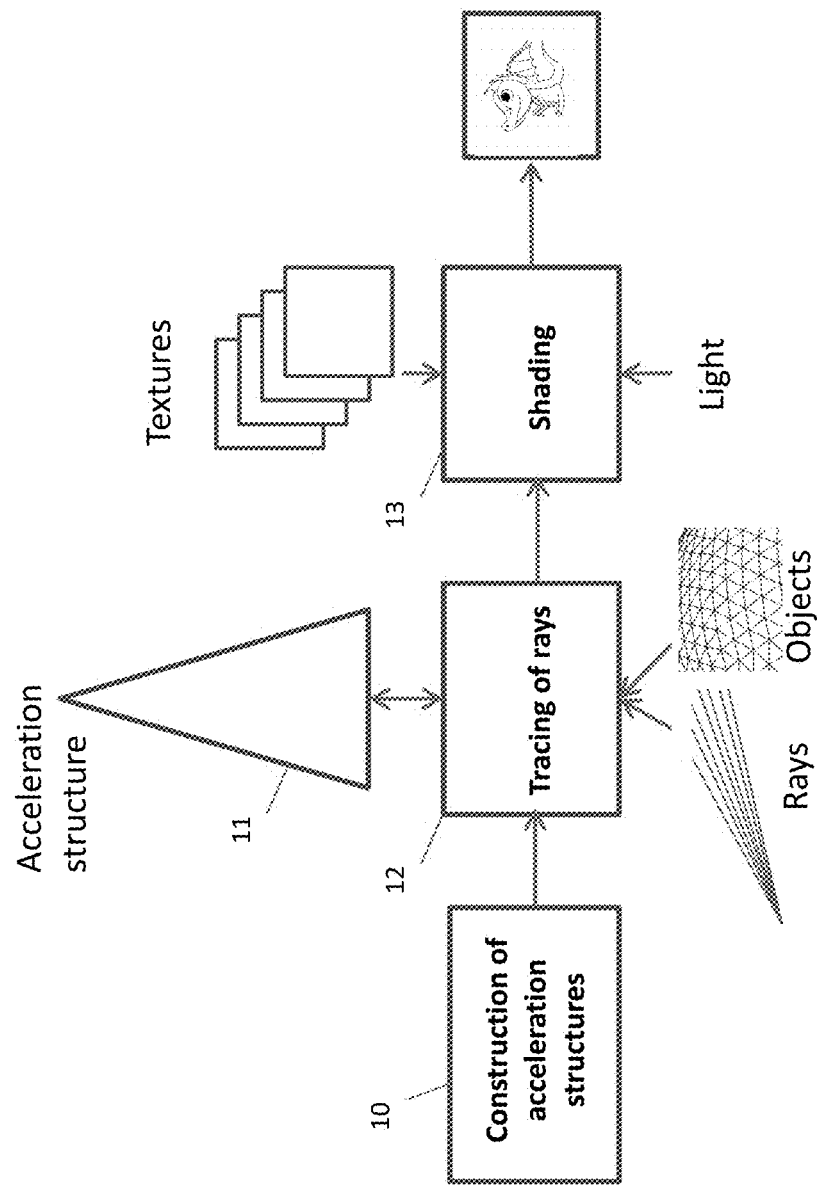
FIG. 1. Prior art. Block diagram of ray tracing.
Figure 2:
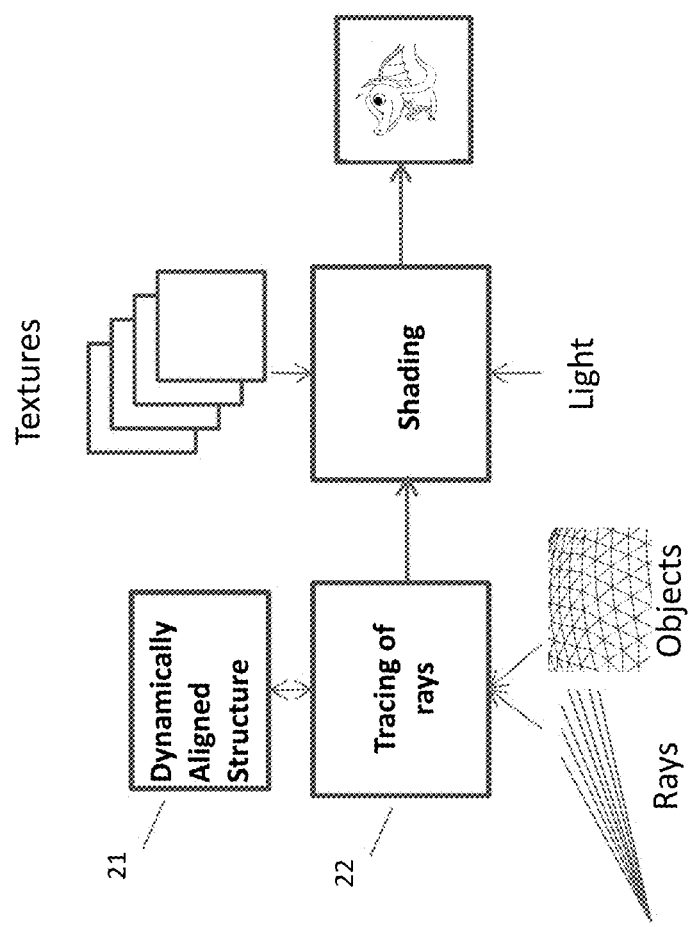
FIG. 2. Block diagram of ray tracing of the present invention.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and devices. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Unless specifically stated otherwise, as apparent from the following discussions, it is appreciated that throughout the specification discussions, utilizing terms such as "processing", "computing", "calculating", "determining", "generating", "creating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, unit, and device (in single or plural form) for performing the operations herein. This may be specially constructed for the desired purposes, or it may contain a general purpose computer selectively activated or reconfigured by a computer program stored in the computer. Several technical terms specifically associated with our disclosure are herein defined.

Computer graphics pipeline refers to the most common form of computer 3D rendering, 3D polygon rendering, distinct from raytracing, and raycasting. In particular, in raycasting, a ray originates at the point where the camera resides, if that ray hits a surface, then the color and lighting of the point on the surface where the ray hit is calculated. In 3D polygon rendering the reverse happens, the area that is in view of the camera is calculated, and then rays are created from every part of every surface in view of the camera and traced back to the camera. The graphics pipeline is usually used in real-time rendering.

Rendering a projection is a 3D computer graphics process of automatically converting 3D wire frame models into 2D images rendering on a computer. The projection can be of a perspective, parallel, inverse or of another shape.

Render target is a feature of modern graphics processing units (GPUs) that allows a 3D scene to be rendered to an intermediate memory buffer, or Render Target Texture (RTT), instead of the frame buffer or back buffer. This RTT can then be manipulated by pixel shaders in order to make searches or apply effects to the final image.

Primary rays, are the first generation of rays in ray tracing, cast into the scene from camera or from eye to solve for visibility, i.e. to find whether the primary ray intersects a surface.

Secondary rays in ray tracing are spawned from primary rays at they ray-polygon intersection points. They are used to compute things like shadows, reflections, refractions, etc. Herein, we use the term collectively for all successive generations as well, such as for ternary rays, forth generation, etc.

Global illumination, is a general name of a group of algorithms used in 3D computer graphics that are meant to add more realistic lighting to 3D scenes, taking into account not only the light that comes directly from a light source (direct illumination), but also subsequent cases in which light rays from the same source are reflected by other surfaces in the scene, whether reflective or not (indirect Ilumination).

Color bleeding in computer graphics is the phenomenon in which objects or surfaces are colored by reflection of indirect light from nearby surfaces. This is a visible effect that appears when a scene is rendered with full global illumination.

Accelerating structures, such as grids, octrees, binary space partitioning trees (BSP trees), kd-trees and BVHs (bounding volume hierarchy), are used in ray tracing to solve for visibility, allowing improvement of render times in speed and efficiency, as compared to naïve ray tracing without accelerating structures.

GPGPU (general-purpose computing on graphics processing units) is the use of a graphics processing unit (GPU), which typically handles computation only for computer graphics, to perform computation in applications traditionally handled by the central processing unit (CPU).

Preset scene in AR, replaces the real time world. It is a preprocessed environment scene to contain the augmented object.

Object can stand for a primitive (polygon, triangle, solid, etc.), or a complex object made out of primitives.

Hit point is a point where a ray intersects an object. Termed also HIP.

Visibility—given a set of obstacles in the Euclidean space, two points in the space are said to be visible to each other, if the line segment that joins them does not intersect any obstacles.

Scene, a collection of 3D models and lightsources in world space, into which a camera may be placed, describing a scene for 3D rendering. Scene model elements include geometric primitives: points or vertices; line segments or edges; polygons or faces.

Clipping, in the context of computer graphics, is a method to selectively enable or disable rendering operations within a defined region of interest.

BRDF

The processes/devices and displays presented herein are not inherently related to any particular computer or other apparatus, unless specifically stated otherwise. Various general purpose systems may be used with programs in accordance with the teachings herein, or it may prove convenient to construct a more specialized apparatus to perform the desired method. The desired structure for a variety of these systems will appear in the description below. In addition, embodiments of the present invention are not described with reference to any particular programming language. It will be appreciated that a variety of programming languages may be used to implement the teachings of the inventions as described herein.

Diverting from prior art technologies, aspects of the present invention teach how to implement ray tracing at both a reduced computational complexity and a high speed. One aspect of the invention relates to path tracing, which is a high-quality ray tracing based on global illumination. Its superior performance stems from a different technological approach to solving the intersection between rays and scene objects. It is based on dynamically aligned structure (DAS), which is a projection of parallel rays, used to carry secondary rays emitting from existing hit points. The DAS mechanism can be implemented either by a GPU (graphics processing unit) graphics pipeline, or by a CPU (central processing unit). The mechanism can solve ray-triangle intersections by use of the conventional graphics mechanism, replacing the expensive traversals of accelerating structures in the prior art.

Figure 3:
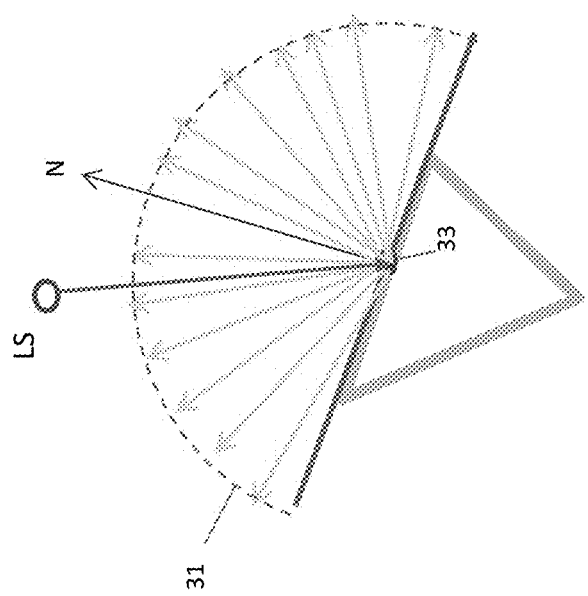
FIG. 3. Prior art. Secondary rays generating global illumination at a point of ray/object intersection.

DAS mechanism. In one aspect the DAS mechanism is applied to path tracing, which is based on global illumination. Global illumination (or indirect illumination) takes into account not only the light that comes directly from a light source, but also light reflected by surfaces in the scene, whether specular, diffuse, or semi-reflective. FIG. 3 depicts the sampling of diffuse inter-reflection from the surrounding environment, at a given surface point. In order to achieve global illumination on a diffuse surface, sampling rays must be shot from a hit point (HIP) 33. HIP is a result of a previous encounter between a ray (primary or secondary) and a triangle. The sampling is done by shooting a ray in a random direction within the boundaries of a hemisphere 31. The hemisphere is oriented such that its north pole is aligned with the surface normal.

Figure 4:
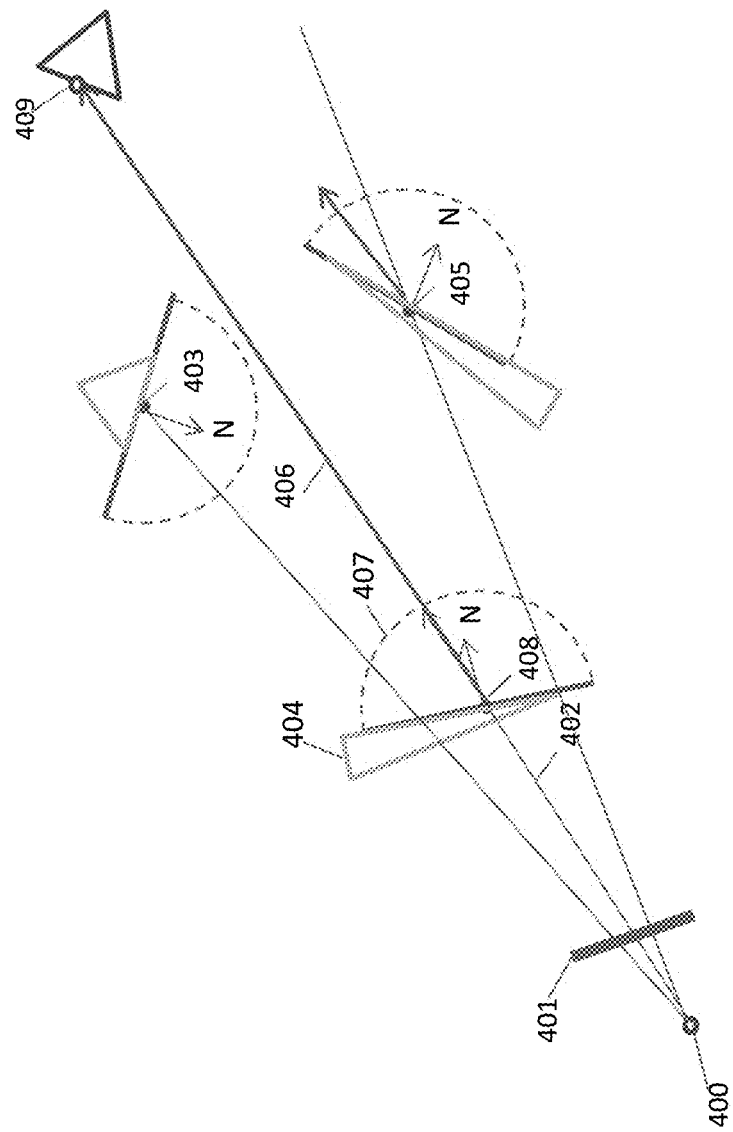
FIG. 4. The basic mechanism of DAS.

The basic mechanism of DAS is demonstrated in FIG. 4, where it is shown to be associated with a perspective projection; however, other projections such as parallel or inverse are conceivable as well. The DAS structure comprises a projection of rays passing through a cluster of HIPs, e.g. 403, 405, 408, and targeting an object. The DAS rays that run into HIPs are used as carriers for secondary rays. For example, a DAS ray that incidentally runs into a HIP 408 carries a secondary ray 406. This ray is falling within the HIP's hemisphere 407. A DAS ray that runs into a HIP or a triangle consists of a starting point 400, and may have two intersection points, the first with a HIP 408 and the second with a scene object (triangle) 409. Additional secondary rays associated with the same HIP 408 can be independently generated by additional DAS structures, carrying additional secondary rays in other directions, within the same hemisphere.

According to an embodiment of the present invention, the DAS projection can be implemented by a CPU software graphics pipeline, but the most efficient device is the GPU hardware graphics pipeline. This well-known art computer graphics pipeline is the process of turning a 3D model into what the computer displays. A graphics pipeline consists of two subsystems: geometry and rasterization. First, all objects within the DAS frustum are transformed by the geometry sub-system, according to the camera view. Then, in the raster sub-system, a ray/triangle intersection point is selected by the Z-buffering mechanism. For example, the DAS ray 402 in FIG. 4 is shot from the origin of the projection 400 and intersects with two objects; 408 and 409. Which of these two objects is selected, the closer or the farther, depends on the API directives (Direct 3D or OpenGL) that control the Z-buffering.

An exemplary cluster of three existing HIPs, with their underlying triangles, are shown, 405, 408 and 403. Secondary rays of HIPs 405, 408 are driven by the DAS structure. As an example, the carrier ray 402 runs into HIP 408. From the point of encounter with the HIP and onwards, it becomes a secondary ray 406, associated with the HIP, seeking for intersection 409. A DAS is relevant only to HIPs that have their hemispheres oriented toward the projection, like 405 and 408, but not 403. The DAS method is mathematically articulated as follows:

Let T be a tree-graph of d levels and let V be its vertices on top of geometries G in space.

Define $V_d$—vertices within V in level d.

Let $C_d$ be a division of $V_d$ to clusters.

We shall extend T to d+1 levels by finding $V_{d+1}$:

Choose cluster $c \in C_d$, with $V_{d_c}$ vertices and define $L_c$—set of mappings from $V_{d_c}$ to $V_{d+1_c}$ such that $V_{d+1_c}$ are projections of the vertices in $V_{d_c}$ on top of G.

$$V_{d+1} \approx \bigcup_c V_{d+1_c}$$

Note that $L_c$ is a set of mappings from the same input, so there can be several target vertices for any input vertex.

Instead of projecting every vertex $v \in V_{d_c}$ on every possible geometry $g \in G$ in $\theta(|\overline{L_c}| \cdot |V| \cdot |G|)$, we project every possible $g \in G$ on every cluster $c \in C_d$ in $\theta(|\overline{L_c}| \cdot (|V|+|G|))$.

In $R^3$ We can utilize traditional 3D graphics pipeline (raster hardware) to achieve fast mappings (projections) in parallel.

We optimize $C_d/L_c$ in throughput/overfitting to have:

Maximum number of vertices per cluster in average (throughput).

Minimum number of [discrete] projections of geometries fitting all vertices (overfitting).

Preprocess/Runtime constraints.

$L_c$ is chosen to have a pseudo-random output, representing a possible segment of distribution for each $v \in V_{d_c}$ to simulate a physical scenario.

Figure 5:
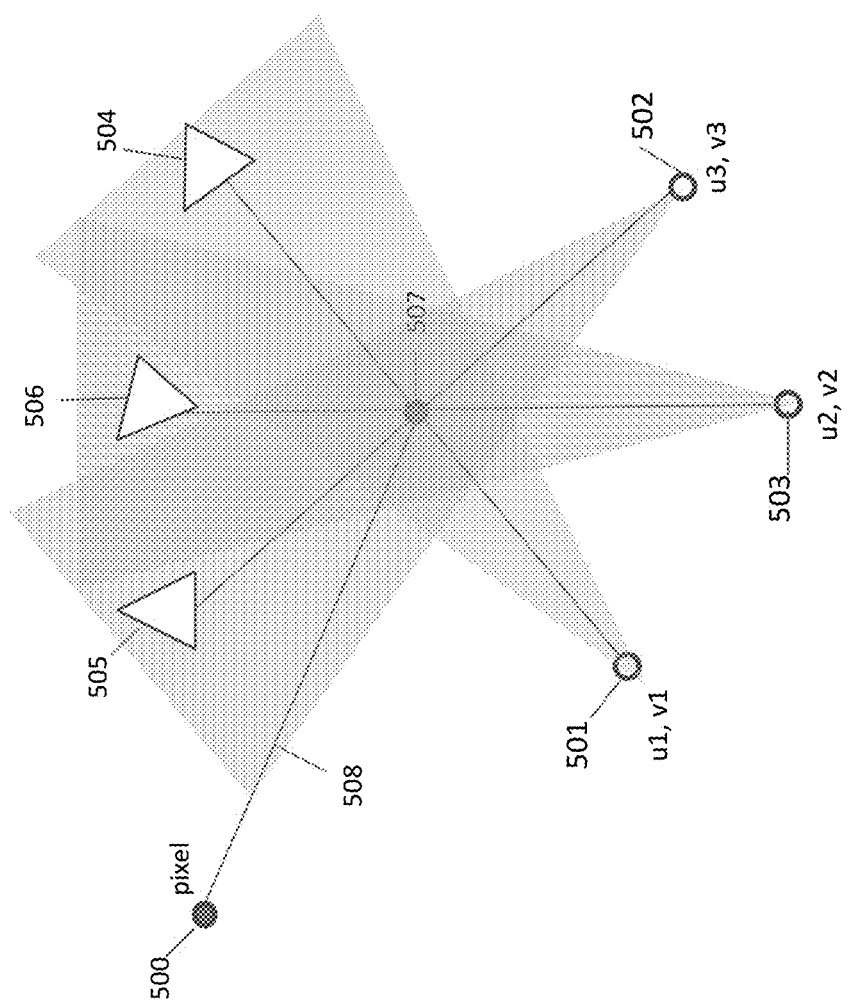
FIG. 5. Multiple DAS projections shot in randomly varying directions.

Multiple DAS projections are shot at a scene or part thereof, in slightly different directions; each direction can be taken in a random manner. As a result, multiple samples of the neighborhood can be taken at each HIP, for global illumination. This is illustrated in FIG. 5. HIP 507 is a primary hit point created by the primary ray 508, shot from the image pixel 500. The HIP is visited by three subsequent DAS projections—501, 502 and 503. Each DAS carries one secondary ray for the HIP 507. Each of the three secondary rays delivers a different sample from the environment, i.e. from surfaces 504, 505, and 506, respectively.

Figure 6:
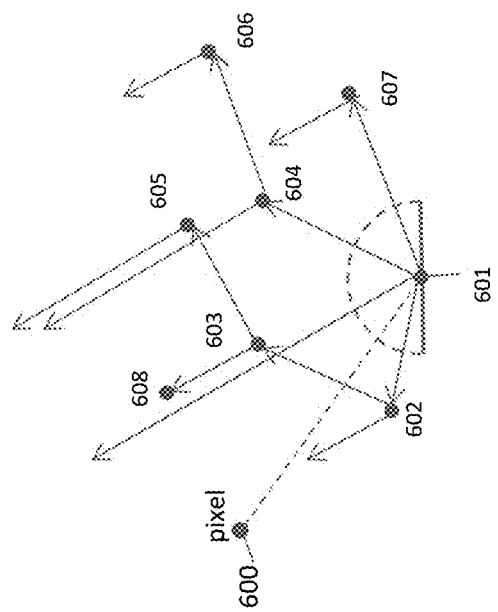
FIG. 6. Generating hit points by successive DAS projections.

There may be various ways to make use of the HIPs that are generated by successive DAS projections. According to one embodiment, shown in FIG. 6, all the newly generated HIPs contribute their data. In this example, four successive DAS projections are used. Assuming that 601 is a primary HIP, generated previously by a primary shot from the image pixel 600, its first successor HIP 602 is a product of the first DAS projection. The second DAS projection, having a different direction, generates HIP children 603 and 604. The third DAS projection generates the HIPs 605, 606, and 607. And then, one child HIP 608 is generated as a result of the fourth DAS projection. The light sampling from all HIPs must be averaged and converged to the correct solution of rendering equation for the image pixel 600, e.g. 608 and 605 converge into 603, which converges into 602, which in turn converges into 601. Finally, the primary HIP 601 converges the aggregated sample values of all its children 602, 604, and 607, and the result goes into pixel 600, as a partial contribution to the pixel among other primary HIPs. A correct rendering equation for all convergances should eventually generate a physically accurate image.

Figure 7C:
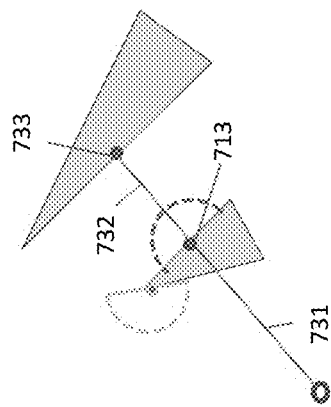
FIG. 7c. A main segment of a DAS ray carries a secondary ray, shot from the HIP.
Figure 7B:
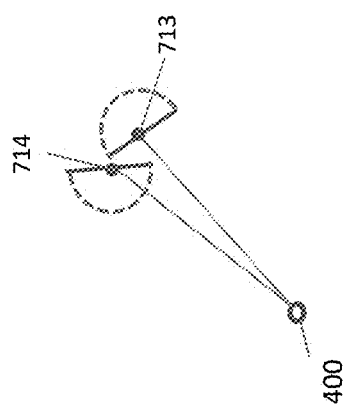
FIG. 7b. An early segment of a DAS ray shot towards a HIP.
Figure 7A:
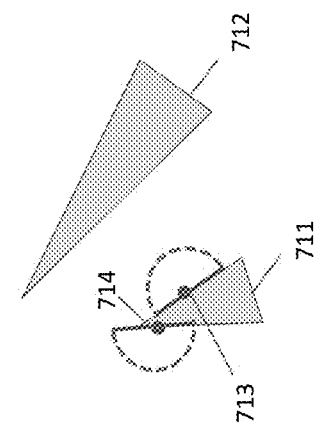
FIG. 7a. Opening scene consisting of two triangles and two primary HIPs.

Secondary rays are meant to intersect with scene objects, as demonstrated in FIGS. 7a-7c. FIG. 7a shows an initial scene consisting of two triangles 711, 712, and two primary HIPs 713, 714. In FIG. 7b a DAS projection 721 is shot towards the HIPs. The HIP 714 faces an opposite direction, therefore it is excluded from the current DAS. The HIP 713, aligned positively with the projection, initiates a secondary ray. As shown further in FIG. 7c, the carrier ray associated with HIP 713 is broken down into two parts; the early segment 731 and the main segment 732. The early segment 731 extends from the DAS origin up to the HIP 713. Its function is to pinpoint the HIP and its depth. Once the depth $Z_{HIP}$ is found, the main segment, from the HIP and further to the intersection point 733, plays the role of a secondary ray, seeking for an intersection. It hits an object at 733, generating a secondary HIP.

According to one embodiment of the present invention, the DAS projection utilizes the Z-buffering mechanism of GPU, as illustrated in FIGS. 8a and 8b. The Z-buffering mechanism must discard objects all the way before the HIP, and starts seeking objects only from the HIP and on. It is based on a selective use of the z-buffering mechanism of a GPU, e.g. the function glDepthMask of the graphics library of OpenGL. This is done in two separate rendering passes. In the first pass the HIPs are rendered as the only objects in the scene, disregarding the geometric data and generating a HIP depth mask. In the second pass the HIP depth mask is used for rendering the scene geometry. The first pass is shown in FIG. 8a. The carrier ray 812, which overlays with the HIP 811, is broken down into two segments, and is processed in two passes. The early segment, rendered during the first pass, extends from the camera 813 up to the HIP. The depth value of the HIP, $Z_{HIP}$, is registered in the HIP depth mask 810. The depth value is kept for a later use for filtering out all the objects on the way to the HIP, during the second pass. In the second pass (FIG. 8*b*), the geometric data is rendered starting at the depth $Z_{HIP}$, 811, e.g. the triangle 825 is ignored. The main segment, the carrier of the secondary ray, hits the triangle at 823. The results of the second pass are stored in a render target 820. Rays that miss HIPs are entirely discarded, considered as early segments in their entirety. Once a render target is completed, the exact ray/triangle intersection point 823 is found by inspecting the render target at the u, v coordinates of the DAS carrier ray. The triangle of intersection delivers essential data, such as color, light, normal, material, etc.

Figure 8C:
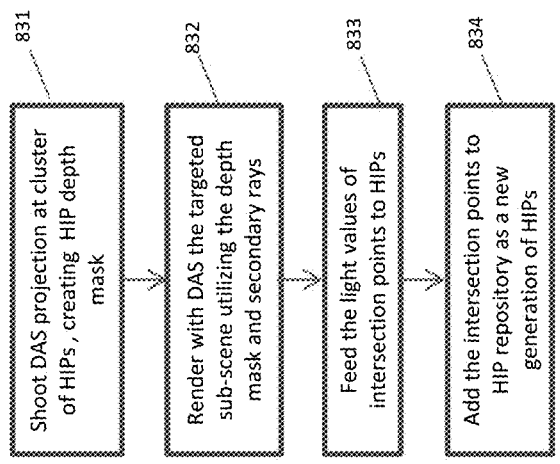
FIG. 8c. DAS flowchart.

The DAS flowchart in FIG. 8*c* summarizes the method of generating and using the DAS mechanism. The DAS projection targets an object (e.g. an augmented object) or a sub-scene, passing through a cluster of HIPs, in order to generate secondary rays for the HIPs. The DAS is shot twice. The first time it is shot at the HIP data only, ignoring the scene geometric data, and producing a HIP depth mask 831. The second time an identical DAS projection 832 is shot. This time the geometric data of the scene is targeted, ignoring the HIP data. The depth mask 810 is employed for the starting point of secondary rays. Secondary rays are driving on the DAS projection, seeking for intersection with the geometric data. The rendering result, a render target texture, a 2D projection of a 3D sub-scene, is basically a collection of all the intersection points between the secondary rays and the geometric data of the scene. An intersection point, related directly to a specific HIP, can be found by searching for coordinates u',v' on the render target, that match the coordinates u,v of the HIP. The color and light values at the intersection points are fed back to the HIPs, delivering samples of global illumination 833. Finally, the intersection points are stored in the HIP repository as the next generation of HIPs 834.

Figure 9:
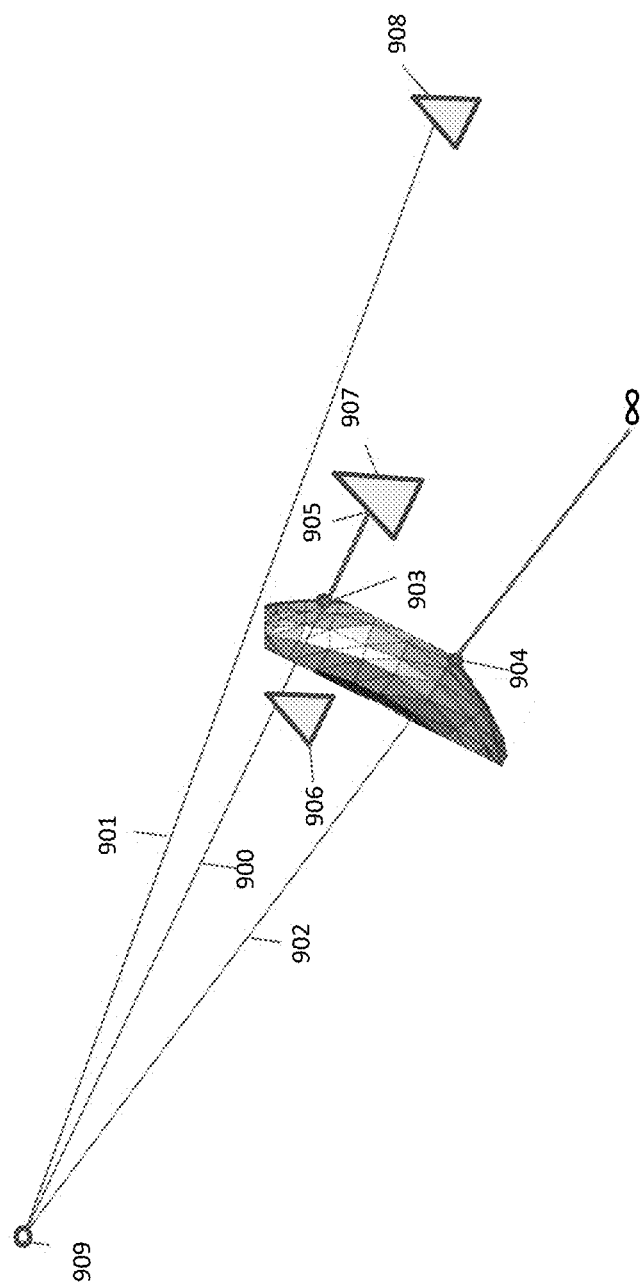
FIG. 9. Various cases of secondary rays carried by a single DAS projection

Various cases of secondary rays are shown in FIG. 9, all carried by a single DAS projection. Ray 900 consists of two segments. The earlier segment, extending from the camera 909 up to HIP 903, discards the triangle 906, while the main segment encounters the triangle 907 at the intersection point 905. The secondary segment of ray 902 does not hit any object. Ray 901 fails to encounter a primary HIP, therefore it is considered as an early segment in its entirety, ignoring the triangle 908.

Figure 10:
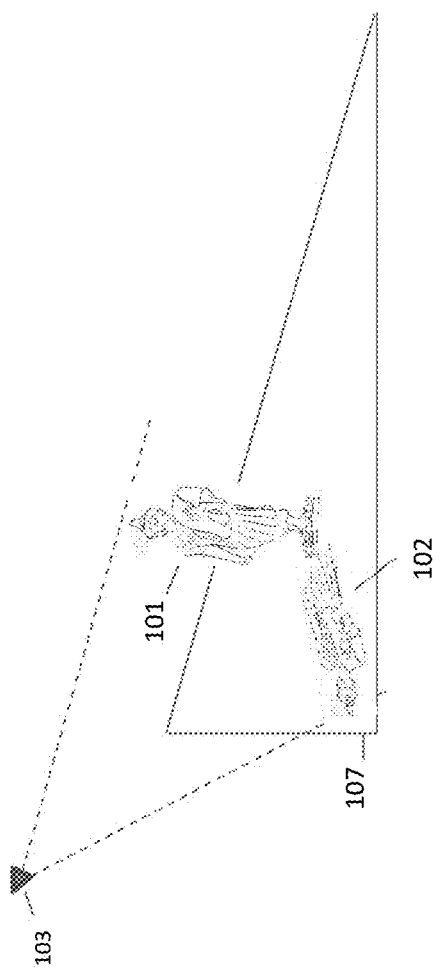
FIG. 10. An augmented object standing on a real desk of a semi-reflective surface.

The DAS mechanism of the present invention is implementable, among other fields, in AR. One of its embodiments enables a localized path tracing, focused on rendering of one or a few objects in the scene, and on a perfect integration between the augmented objects and the real environment. FIG. 10 shows an example of an augmented object, a Buddha statue 101, standing on a real desk of a semi-reflective surface 107. What is needed to generate a photo-realistic appearance of the statue is not just the image of the object 101, but additional effects as well. The effect the augmented object may have on its real environment would result in reflection 102, shadow and color bleeding that modify the preset environment. On the other hand, the impact of the environment on the augmented object may result in lighting and reflection of the object itself.

According to an embodiment of the present invention, the direct image of the object, reflection and color bleeding are generated by three separate tasks, and the unified result is fed to the image pixels.

Figure 11:
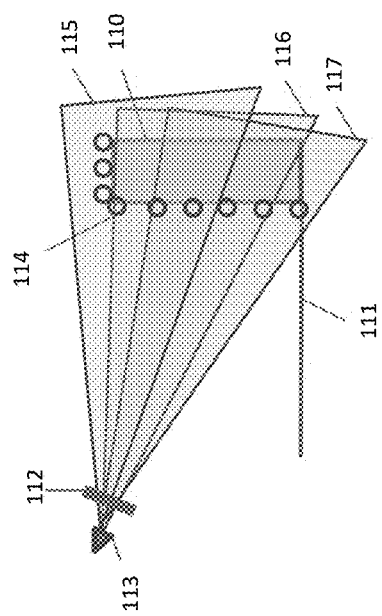
FIG. 11. Direct imaging of augmented object. Primary rays are shot from the camera and tilted at varying directions.

Direct imaging of an augmented object. The basic image of the augmented object can be reconstructed just from the primary HIPs that cover the object's surface. However, for a global illumination effect, such as the environment reflected in the object, secondary rays shot from the object to its environment are required. The rendering task of the augmented object 110 is shown in FIG. 11. For simplicity, it is described in a 2D drawing. The camera 113 shoots primary rays 114 at the augmented object, seeking intersections with the object. These points of intersection become HIPs, meant to be used as a starting point for secondary rays, for global illumination.

The shootings of primary rays are repeated while tilted, each with a slight change of direction, such that multi-sampling in the image pixels 112 is attained. The change of directions is done in a random fashion, in order to prevent unwanted patterns in the image. Multi-sampling contributes to an antialised quality of the image. In FIG. 11 three primary shootings are shown 115, 116, and 117. As a result, a cluster of primary HIPs 114 is created.

A truthful appearance of the augmented object as an integral part of the scene, is achieved by global illumination. The relevant environment for global illumination is sampled by secondary rays, shot from primary HIPs toward a relevant part of the scene. The relevant parts of the scene are those visible from the camera reflected in the object, if the object is reflective. For example, such a relevant part can be the sub-scene 123 in FIG. 12*a*, because its reflection in the object can be seen from the camera 127.

Figure 12B:
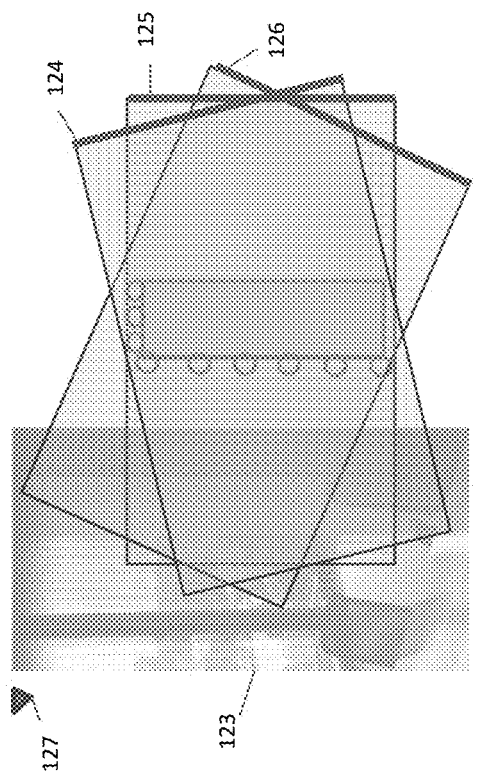
FIG. 12b. Direct imaging of augmented object. Secondary rays are generated by multiple DAS shots of parallel projection, saving rendering of a bigger data.
Figure 12A:
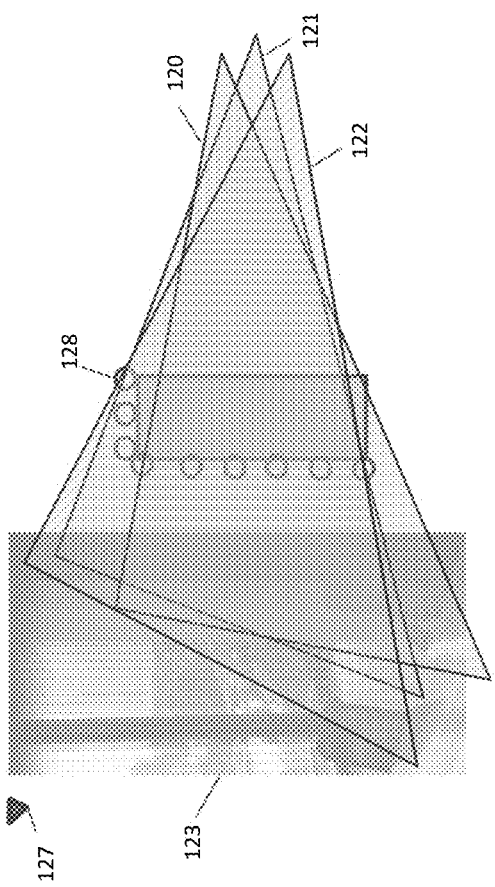
FIG. 12a. Direct imaging of augmented object. Secondary rays are generated by multiple DAS shots of a perspective projection.

The secondary rays are generated by DAS structures, either of perspective projection as in FIG. 12*a*, or parallel projection as in FIG. 12*b*. In FIG. 12*a* the DAS projections are passing through the primary HIPs (e.g. 128), targeting the sub-scene 123.

Since all the successive DAS projections are targeting the same sub-scene 123, this sub-scene can be clipped out from the full scene, to enable a rendering operations within a reduced region, thus minimizing the rendering process.

Each of the multiple DAS projections is generated randomly from a slightly different point of view and in a different direction, creating multiple secondary rays at each HIP. The use of randomness prevents the appearance of unwanted patterns in the image. Secondary rays sample global illumination for a HIP (FIG. 3, 31). The sampled illumination impacts the image according to the object's material and the level of its specularity or diffuseness, e.g. if the object is reflective or partly reflective, it will result in reflection of the environment in the object, or just an amount of background lighting if it is diffuse, creating the object's response to the environment.

The more projections of DAS, the better covering of global illumination. However, more projections may impair the performance. Therefore, there is a trade-off between image quality and performance.

Figure 12C:
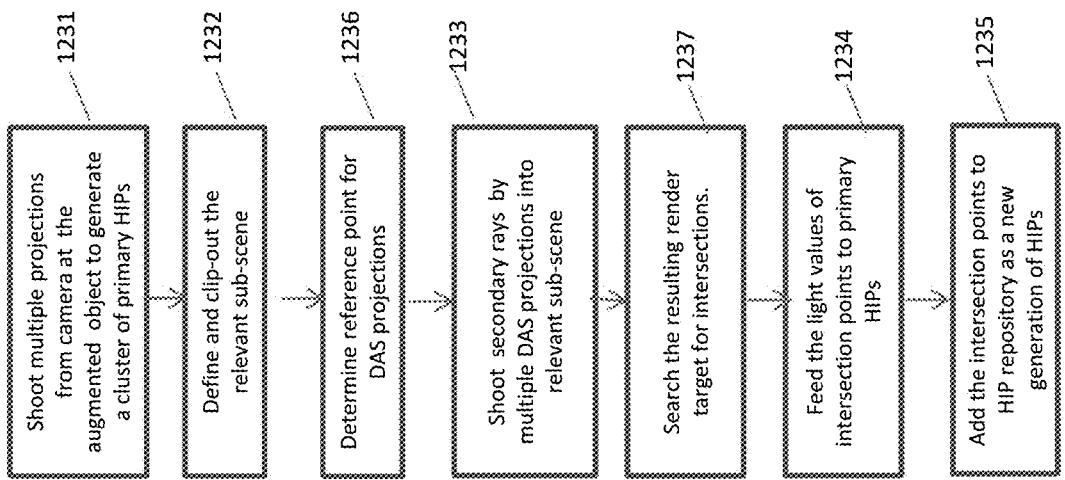
FIG. 12c. Flowchart of generating direct image of an augmented object.

The method of generating a direct image of an augmented object is summarized in a flowchart in FIG. 12*c*. First, multiple primary projections are shot from the camera (eye, view point) at the augmented object to generate a cluster of primary HIPs 1231. Then the parts of the scene to be targeted by secondary rays should be defined, possibly clipped as a sub-scene 1232, and a reference point for DAS projections must be set according to the chosen sub-scene 1236. Then, secondary rays, generated by multiple DAS projections, are shot into the relevant sub-scene 1233. The result of the DAS projection is a render target texture of the determined sub-scene. The seeking for an intersection between a secondary ray and the targeted sub-scene is done by matching coordinates of the related primary hit point and the render target texture 1237. The color and light value sampled at the intersection point, between secondary ray and encountered triangle 1234, is fed back to the HIP of origin. The above procedure can repeat if more than one sub-scene are taken. Then, finally, the intersection points are added to the HIP repository as a new generation of HIPs 1235. The processed samples of color and light values, aggregated from all the primary hit points, are converged according to a rendering equation, into the image pixels, creating a full image of the augmented object, affected by the three-dimensional scene.

Reflecting the augmented object. Reflection of the object's image in the environment items is accomplished by following a ray from the camera to the surface at the scene, and then bouncing toward the augmented object. Reflection on a shiny surface or tile enhances the photo-realistic effects of a 3D rendering. The extent of reflection depends on surface's reflectivity (the BRDF of the material).

Figure 13B:
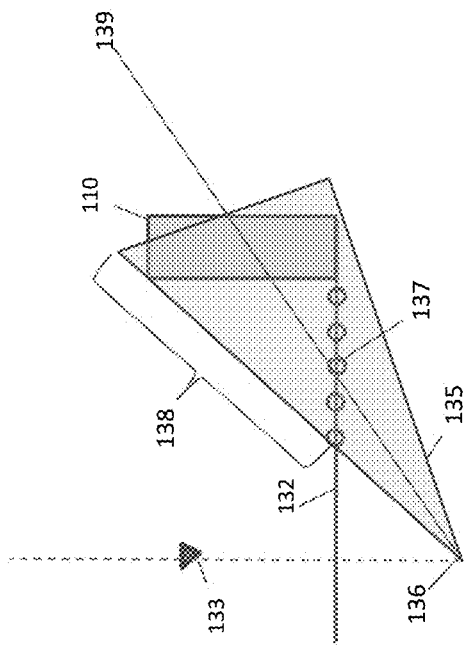
FIG. 13b. Reflected imaging of the augmented object. The secondary rays, carried by DAS projection, are shot at the object through the cluster of primary HIPs.
Figure 13A:
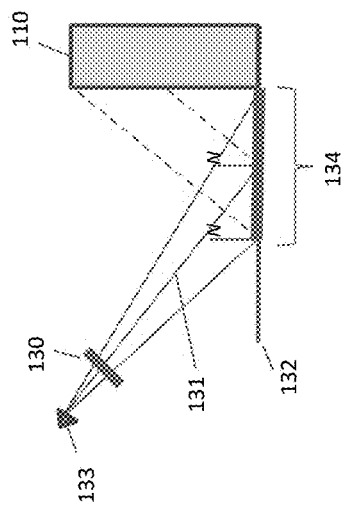
FIG. 13a. Reflected imaging of augmented object. Primary rays are shot at the reflection area, repeated and tilted multiple times.

First, the reflective or semi-reflective surfaces (or items) in the real scene, which may reflect the augmented object, must be identified. Then we shoot primary rays at the surface in which the object is intended to be reflected, or part thereof, generating primary HIPs. From these HIPs, we shoot secondary rays targeting and sampling the augmented object. This way of generating reflections is illustrated in FIGS. 13a and 13b. Primary HIPs covering the intended reflection area are created by primary rays that are shot from the camera 133, through the image screen 130, toward the area of reflection 134. The location and boundaries of the reflection area 134 in surface 132 is determined according to the location of the camera, the distance and the size of the augmented object 110, and the consideration of the principal direction 131 according to the Snell law. The primary shots are repeated multiple times for multi-sampling in the image pixels. Each successive time the primary projection is slightly deviated randomly from the principal direction, such that each pixel of the image gets multiple samples. The surface of the reflection area 134 becomes covered by a dense array of primary HIPs. The randomness of the multi-sampling prevents unwanted patterns in the resulting image.

FIG. 13b describes the generation of the reflected image by secondary rays. The reflection of the augmented object 110 on the surface 132 is reconstructed from the sampled data in primary HIPs, which is gathered by shooting secondary rays at the object. We use the geometric point 136, which is the reflection of the camera 133 in the surface 132, as a reference point for multiple DAS projections. Each projection is shot from a different point, randomly deviated from the reference point 136.

The DAS 135, shown in FIG. 13b, originates in the reference point 136, directed along the axis 139, which is pointing towards the center of the augmented object 110. The DAS carries secondary rays 138, all starting at the primary HIPs (e.g. 137) and targeting the augmented object.

In order to take a spectral sampling of the BRDF function at a HIP, the multiple DAS projections are randomly deviated from the reference DAS projection—the one that starts at the reference point and has an axis of projection directed at the center of the augmented object. The inclination from the referenced DAS is done randomly, slightly deviating from the reference point 142 and central axis 145, as shown in FIG. 14a. Three DAS projections are shown. Assuming that the reference DAS originates exactly at the reference point 142, and its axis 145 takes the central direction, then the two other DAS projections start at a nearby points 141 and 143, and their axes 144 and 146 deviate from the central direction 145. As an example, we chose a HIP 140 from which three secondary rays are shot: 144, 145, and 146, each carried by a different DAS.

Figure 14B:
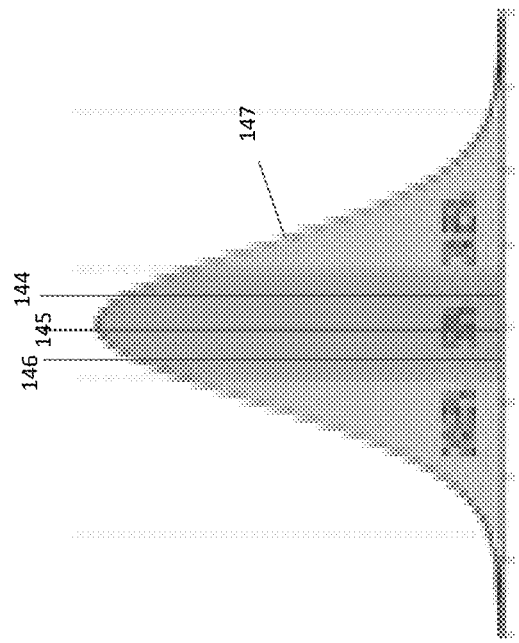
FIG. 14b. Reflected imaging of the augmented object. The contribution of a secondary ray to the aggregated light energy comply with the BRDF function.
Figure 14A:
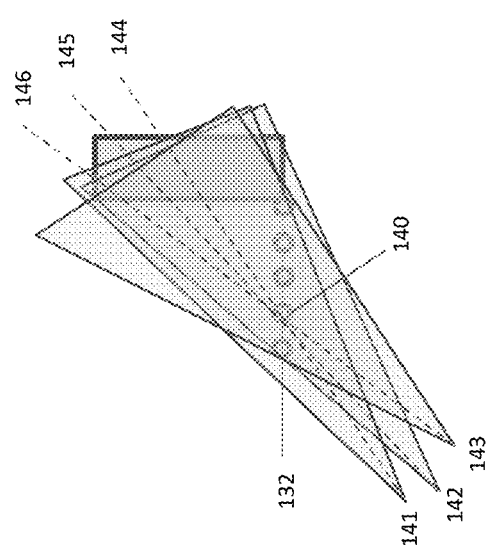
FIG. 14a. Reflected imaging of the augmented object. The multiple DAS projections are randomly tilted.
Figure 14C:
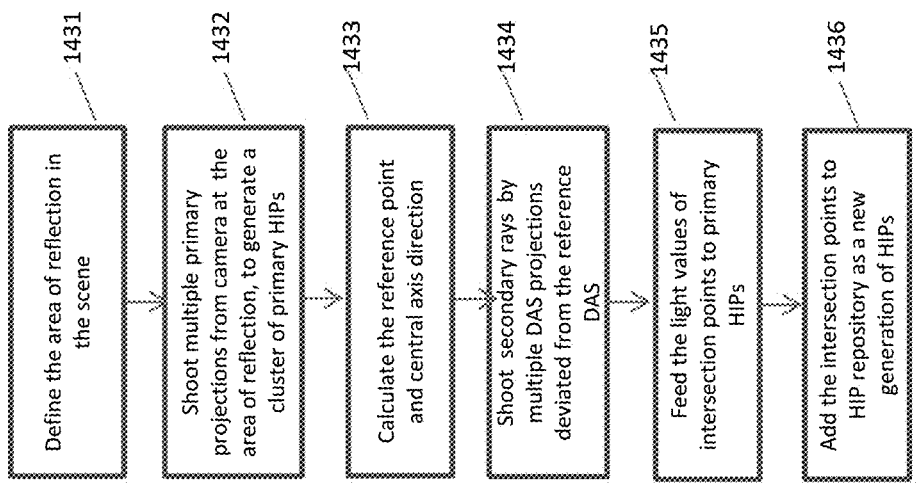
FIG. 14c. Flowchart of reflected imaging.

The relation between the deviation of a DAS secondary ray from the reference DAS, and its contribution to the aggregated light energy, is shown in FIG. 14b. It is strongly connected with the BRDF function 147 of the surface material 132. Each of the three secondary rays 144, 145, and 146, are shot from the same HIP in a different direction, bounded by the hemisphere of FIG. 3. As a result, its sampled data contributes to the aggregated light energy, according to the BRDF function. Let's assume that the secondary ray 145 goes in an exact Snell direction, then it brings the maximal contribution at the peak of the BRDF function 147. Secondary rays 144 and 145 have a smaller contribution, depending on the BRDF value at the distance from the peak. The way of generating a reflected image of an augmented object is summarized in the flowchart in FIG. 14c. First, the area in the real scene where the augmented object should reflect is determined 1431. Then, multiple primary projections are shot from the camera at the area of reflection, generating a cluster of primary HIPs 1432. Next, the location of the reflected camera, as a point of reference for DAS projections, and the central axis directed toward the augmented object, must be calculated 1433. Then, secondary rays generated by DAS are shot toward the object. The multiple DAS projections are randomly tilted, deviating from the reference DAS 1434. Next, the light values sampled in the intersection points are fed to their respective HIPs of origin 1435. Finally, the intersection points are added to the HIP repository as a new generation of HIPs 1436. These HIPs can serve for producing further generations of secondary rays.

Color bleeding is the phenomenon in which objects or surfaces are colored by reflection of indirect light from nearby surfaces. It is a global illumination algorithm in the sense that the illumination arriving at a surface comes not just directly from the light sources, but also from other surfaces reflecting light. Color bleeding is viewpoint-independent, which makes it useful for all viewpoints. The color bleeding effect in AR or VR would occur in the direct neighborhood of the augmented object. An example of generating a color bleeding effect by an embodiment of the present invention is illustrated in FIG. 15a. The augmented object 154, standing on a substrate 152, is supposed to create a color bleeding effect on the real substrate 152. First, we define the boundary of a color bleeding patch around the center of the augmented object where the color bleeding will appear. The size of the patch depends on the involved materials, and the distance and the amount of light. Then we shoot primary rays from the camera 153 at the patch 155, in the absence of the augmented object. A cluster of primary HIPs is created, covering the patch. The primary shots are repeated multiple times, each time at a slight deviation from the principal direction 151. The principal direction 156 is from the camera toward the center of the object's standing location.

Figure 15B:
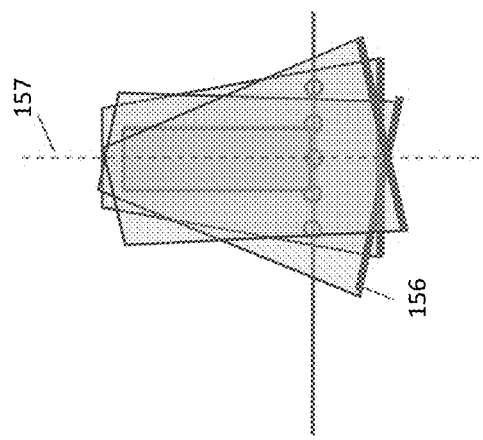
FIG. 15b. Color bleeding effect of the augmented object on its environment. Secondary rays.
Figure 15A:
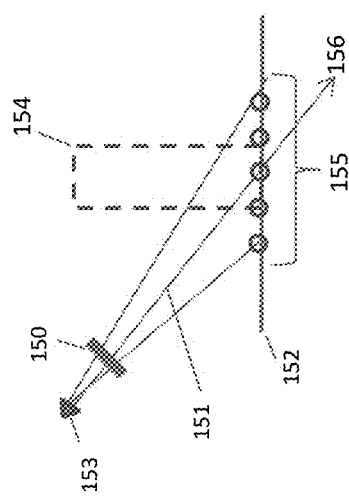
FIG. 15a. Color bleeding effect of the augmented object on its environment. Primary rays.

FIG. 15b illustrates the use of secondary rays. The color bleeding effect is reconstructed by sampling the object by secondary rays, which are shot from the primary HIPs toward the object. The secondary rays are generated by DAS projections. The DAS projection, unlike in the cases of reflection or of direct imaging of the augmented object, gets the shape of an inverse projection 156. Multiple DAS projections are done, each time at a slight deviation from the principal direction. The samples of the object's surface are taken from the substrate, enabling a calculation of the amount of energy on the substrate, assuming that a correct rendering equation is used.

Figure 15C:
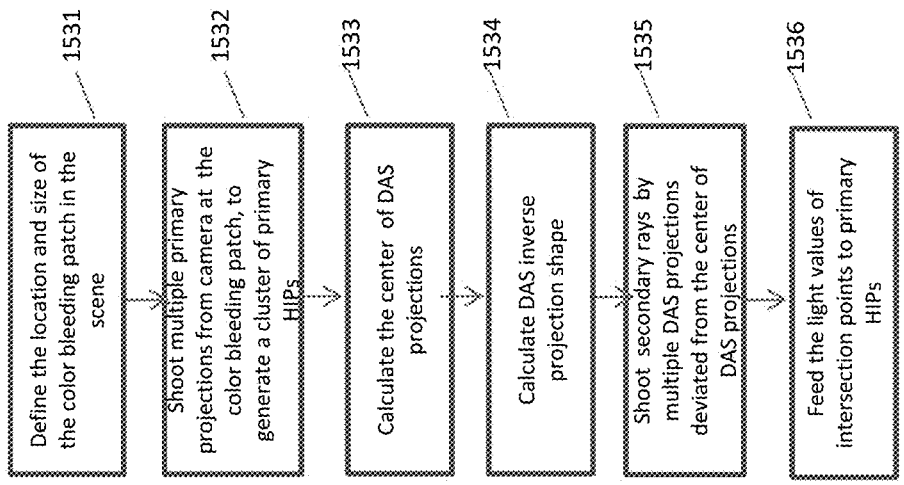
FIG. 15c. Flowchart of generating color bleeding effect.

The way of generating color bleeding is summarized in the flowchart of FIG. 15c. First, the location and size of the color bleeding patch in the scene is defined 1531. Then, multiple primary projections are shot from the camera at the color bleeding patch, to generate a cluster of primary HIPs 1532. Next, a reference point at the center of DAS projection is calculated 1533, as well as the required shape of the inverse projection 1534. Then secondary rays are shot by multiple DAS projections, each randomly deviated from the center of DAS projections 1535, and the light values of intersection points are fed to primary HIPs 1536. In color bleeding this is the only generation of HIPs.

Figure 16:
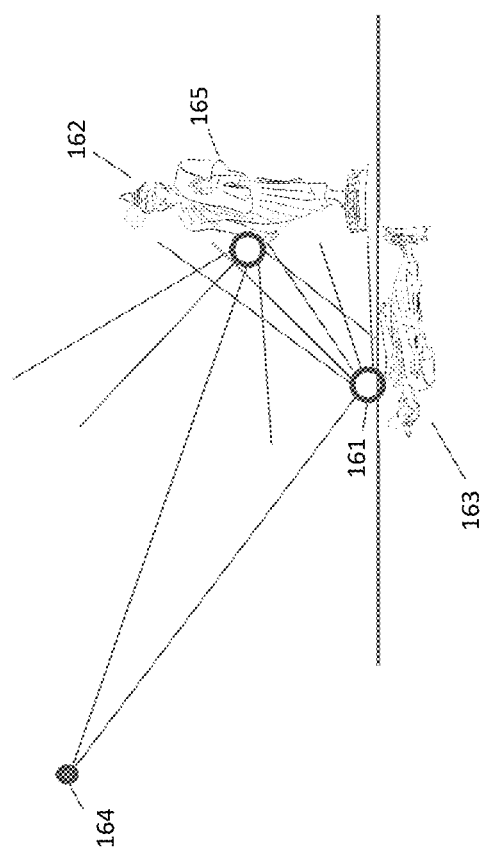
FIG. 16. Collecting the sampled light values at the pixel of origin.

Collecting light and color values. The values of all samples in an HIP must be processed by a correct rendering equation for a physically accurate result. Parameters that are taken into account are the surface material, the geometry of the scene, the active area of the hemisphere, and others. For a specific image pixel, the light contribution of all HIPs generated by primary shots from the pixel, and all their secondary successors, must be aggregated, processed, and converged into the source pixel for image. As shown in FIG. 16, the samplings from the object and from its environment are converged into image pixels 164. The pixel receives inputs from a primary HIP 165 on the surface of the augmented object, which in turn collects values from its successive generations. The pixel receives as well input from a reflective HIP 161 and its successive generations. The processed results of 165 and 161 are weighted, and then gathered in the image pixel 164.

Implementation. The core of the present invention is the DAS mechanism. When implemented in path tracing, it generates secondary rays and locates their intersection with scene objects, excluding the use of accelerating structures of prior art. The DAS mechanism, which is based on a conventional raster graphics pipeline, is implementable either by a GPU hardware pipeline, or by a CPU software pipeline. The parallel structure of GPU makes it more efficient for graphics pipeline than general-purpose CPU. A GPU is a specialized electronic circuit designed to accelerate the graphics pipeline. Where a CPU consists of a few cores focused on sequential serial processing, GPUs pack thousands of smaller cores designed for multitasking. There are two main types of graphics processor: integrated and discrete. The DAS can be either utilized by a separate component in a system (discrete GPU), or by an embedded GPU on the CPU die (integrated GPU). Integrated GPU is used in embedded systems, mobile phones, personal computers, workstations, and game consoles.

The computing tasks that create the augmented objects and their visual context within the preset scene, as described in a great detail hereinbefore, are mostly based on graphics pipeline. For these tasks, the use of GPU is a great advantage. There is also additional task of collecting the sampled values of global illumination, processing these values according to the rendering equation, and converging the results in the image pixels. The collecting task, being associated with conventional processing, can be implemented either by a CPU or by a GPGPU. There is also an additional task, associated with user's viewing device 171, shown in FIG. 17. For augmented reality those are wearable computer glasses that add information alongside or to what the wearer sees. Typically this is achieved through an optical head-mounted display (OHMD) or embedded wireless glasses with transparent heads-up display (HUD) or AR overlay that has the capability of reflecting projected digital images as well as allowing the user to see through it. For virtual reality, the viewing device 171 can represent a virtual reality headset that provides virtual reality for the wearer. VR headsets are widely used with computer games but they are also used in other applications, including simulators and trainers. They comprise a stereoscopic head-mounted display (providing separate images for each eye), stereo sound, and head motion tracking sensors. Either way, component 171 must be interfaced to the computing platform by an API software, which is typically implemented by a CPU.

Figure 17:
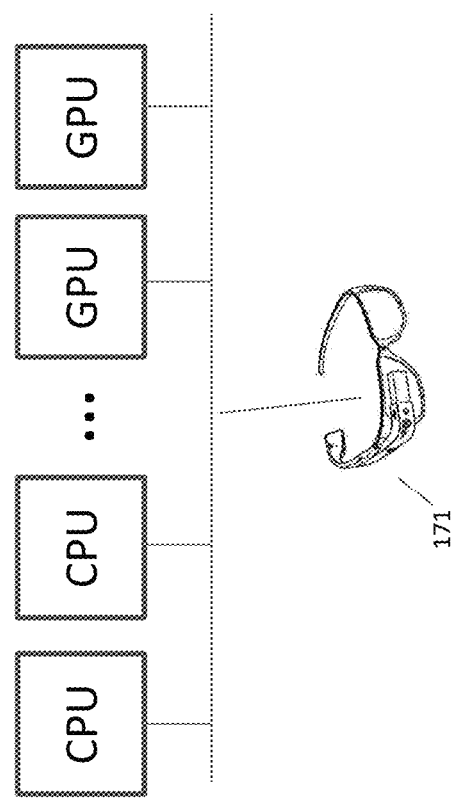
FIG. 17. Hardware for AR and VR.

Consequently, the embodiments of the present invention call for a combined implementation of CPUs and GPUs, as generally shown in FIG. 17. The GPUs may stand for discrete graphics, integrated graphics or a combination of both: integrated graphics teaming with a discrete graphics.

Integrated graphics means that the GPU is integrated onto the CPU die and shares memory with the processor. Since integrated GPUs rely on the system RAM, they don't have the computing power of their discrete counterparts that are contained on their own card and come equipped with their own memory, VRAM. Integrated GPU has a lower memory bandwidth from system RAM, compared to discrete graphics cards between their VRAM and GPU core. This bandwidth is what is referred to as the memory bus and can be performance limiting. Moreover, as a GPU is extremely memory intensive, integrated processing may find itself competing with the CPU for the relatively slow system RAM, as it has minimal or no dedicated video memory. For the best possible graphics performance, discrete graphics chips outperform integrated GPUs.

On the other hand, sharing the same RAM memory can also be a benefit, as the graphics cores on a multicore chip can better collaborate with CPU cores for exchange big data. The pure graphics tasks of imaging objects, reflections and color bleeding produce big data of light values, that must be collected and calculated for rendering equation by the CPU cores.

However, despite the performance advantage of a discrete GPU, it is desirable to use integrated GPU for implementation of the present invention in such applications as augmented reality, virtual reality, and computer games, for its better power-efficiency, affordability, portability and versatility. Integrated GPU, as a constituent of a multicore CPU chip, is used in embedded systems, mobile phones, tablets and game consoles.

In addition to quest of use of discrete GPU or integrated GPU, there is also an alternative of using a hybrid system having discrete and integrated GPUs, collaborating and alternating, depending on the task.

The invention claimed is:

1. A computer system for fast generation of ray traced reflections of a virtually augmented object into a real-world image, utilizing a raster graphics pipeline, the system comprising:
   at least one general purpose processor,
   at least one graphics processor,
   a digital camera,
   a computer memory,
   geometric data of single augmented object,
   a real-world image, and
   a render target memory;
   wherein for ray traced reflections
   a. the at least one general purpose processor is configured to take a real-world image with the digital camera and to store the image in the computer memory;

wherein with the graphics processor is configured to
b. identify reflective surface areas in the real-world image that may reflect the augmented object;
c. project primary rays from the camera's spot at the identified reflective surfaces in the real-world image, generating a cluster of primary hit points;
d. shoot projections of carrier rays at the augmented object through the cluster of generated primary hit points, whereas only those carrier rays that intersect the primary hit points are used for generating secondary rays;
e. generate a render target texture of intersections between secondary rays and the augmented objects;
f. reveal and sample light values in the render target texture at the points of intersection between secondary rays and augmented object,
g. feed the sampled light values of the intersection points into their respective primary hit points; and
h. reconstruct reflections of the augmented objects on the reflective surfaces of the augmented object, from the fed light values.

2. The system of claim 1, wherein the location and boundaries of the area of reflection is determined according to location of the camera, distance and size of the augmented objects, and consideration of a principal direction.

3. The system of claim 1, wherein the shot projection of primary rays is implemented by a hardware graphics pipeline of the graphics processor.

4. The system of claim 1, wherein the projection of primary rays is implemented by a software graphics pipeline.

5. The system of claim 3, wherein in case of generating a semi-reflective reflection, each successive projection of carrier rays is deviated from the principal direction.

6. The system of claim 1, wherein the secondary rays commence at the area of reflection.

7. The system of claim 1, wherein rays that miss hit points are entirely discarded.

8. The system of claim 1, wherein rays that miss hit points are considered as early segments in their entirety.

9. The system of claim 1, wherein the projection of carrier rays is implemented by a hardware raster pipeline of GPU.

10. The system of claim 1, wherein the intersection points between secondary rays and the augmented object maybe considered as a start point for a next generation of hit points.

* * * * *